July 12, 1938.  J. M. SHEEDY  2,123,477
VALVE
Filed April 19, 1937
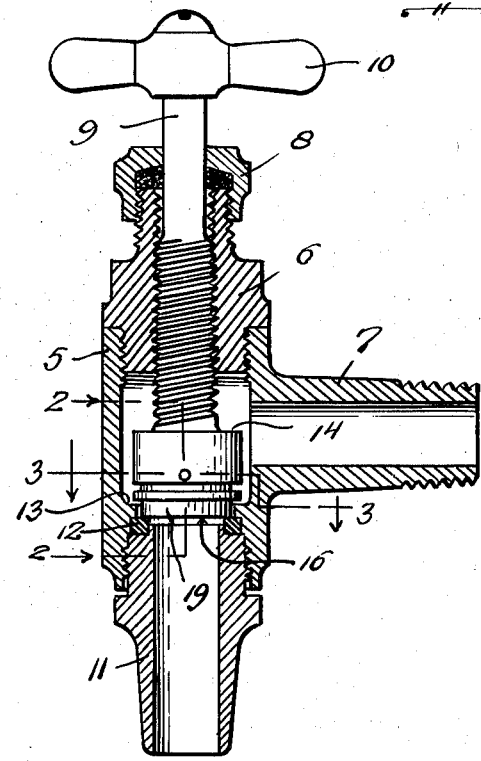
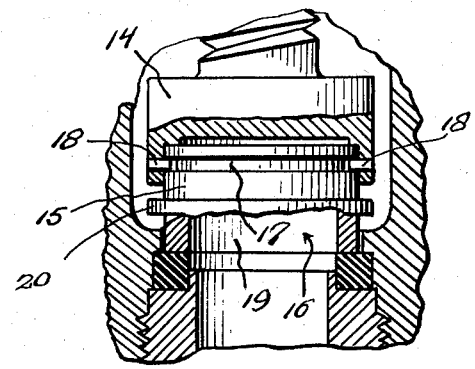
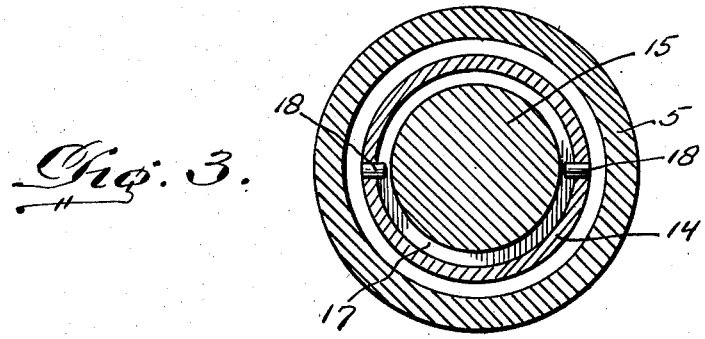
Inventor.
John M. Sheedy,
By Stanley Burch
Attorney Patented July 12, 1938

2,123,477

UNITED STATES PATENT OFFICE 2,123,477

VALVE

John M. Sheedy, Ontario, Calif.

Application April 19, 1937, Serial No. 137,848

1 Claim. (Cl. 251—27)

This invention relates to an improved valve suitable for use as a water faucet.

Objects of the present invention are to provide a valve of the above kind which is extremely simple and durable in construction, and efficient in operation, which may be opened or closed with little effort, which is characterized by slow wearing of the contacting parts of the valve head and valve seat, and which is so constructed that the valve seat may be readily and easily renewed without the necessity of a secondary shut-off valve in the supply pipe connected with the present valve.

Other objects and features of the present invention will become apparent from the following description when considered in connection with the accompanying drawing, and the present invention consists in the novel form, combination and arrangement of parts hereinafter more fully described, shown in the accompanying drawing and claimed.

In the drawing:

Figure 1 is a central vertical sectional view of a valve constructed in accordance with the present invention.

Figure 2 is an enlarged fragmentary vertical section taken on line 2—2 of Figure 1; and Figure 3 is an enlarged horizontal section on line 3—3 of Figure 1.

Referring in detail to the drawing, the present valve includes a vertical casing or body 5 having a cap or bonnet 6 threaded into the upper end thereof and provided with a side inlet nipple 7, the cap or bonnet 6 being provided with the usual packing gland 8 for the smooth upper portion of a stem 9 having a threaded lower portion engaging axial threads of the cap or bonnet 6. The axial threads of the cap or bonnet 6 and the threaded portion of stem 9 are preferably of a high angle so that slight turning of stem 9 will cause considerable longitudinal movement of said stem for effecting rapid seating or unseating of the valve head carried by the lower end of said stem 9. The projecting upper end of stem 9 is provided with a suitable handle 10.

The casing 5 is internally threaded at the bottom to receive a discharge spout 11, and this discharge spout is externally reduced at its upper end and has a valve seat gasket 12 removably fitted on this reduced upper end. Such valve seat gasket 12 is firmly clamped between the upper end of the spout or nozzle 11 and an internal annular flange 13 provided in the body 5 below the inlet nipple 7. However, the flange 13 is of a size to engage only the outer portion of the upper surface of valve seat gasket 12 so that the inner portion of said upper surface may be engaged by the valve head as will be presently described.

The lower end of valve stem 9 is provided with a cylindrical enlargement 14 having a cylindrical socket formed in the bottom thereof and within which is revolubly fitted the cylindrical upper portion 15 of a valve head 16. This cylindrical upper portion 15 of the valve head has an annular circumferential groove 17 into which projects the inner ends of pins 18 carried by the stem enlargement 14. Thus, the head 16 is swiveled to the lower end of stem 9 so that it may remain stationary after engagement with the valve seat gasket 12 and upon continued rotation of stem 9 for firmly seating said head 16. The same operation may take place when rotating the stem 9 to unseat the head 16, thereby permitting seating or unseating of the valve head with comparative facility and ease and without causing relative movement between the engaging parts of the valve head and valve seat such as might cause rapid wearing or injury thereto. The valve head 16 has a depending annular flange 19 arranged to seat at its lower edge upon the exposed inner portion of the upper surface of valve seat gasket 12. Also, the intermediate portion of the valve head 16 is provided with an external annular flange 20, and the arrangement is such that the flange 19 will fit fairly snugly within the flange 13 of the body 5 when engaged with the gasket 12 and the flange 20 will be spaced above the flange 13 when the valve seat gasket 12 is in place. However, when the spout or nozzle 11 is removed so as to remove the valve seat gasket 12 with it for renewal of said valve seat gasket, the valve head 16 may be lowered by slight rotation of stem 9 so that the flange 20 of the valve head is seated on the flange 8 of the body 5 for preventing very little flow of water through the valve. Thus, the water may be merely cut off by the present valve when the valve seat gasket 12 is removed for renewal of the same, and no secondary shut-off valve is required in the supply line connected with the inlet nipple 7. When the valve seat gasket 12 has been renewed, the spout or nozzle may be threaded into place and the valve head 16 may be retracted to permit final threading movement of the spout in place so that the valve seat gasket 12 is firmly clamped between the upper end of said spout or nozzle 11 and the flange 13 of body 5.

A valve constructed in accordance with the present invention, besides possessing the advantages noted above, is free from pounding or dripping as there are no parts that can become loose to cause vibration. There are no screws to corrode, and the valve is admirably suited to carry out the stated objects of the invention.

What I claim as new is:

A valve of the character described comprising a vertical casing having a side inlet nipple and provided with an internal annular flange below said inlet nipple, a cap on the upper end of said body, a valve stem having threaded engagement with said cap and provided at its lower end with a valve head having a depending annular seat-engaging flange and formed with an external annular shoulder above said seat-engaging flange, a spout removably threaded in the lower end of said body and having a reduced upper end, a valve seat gasket fitted on the reduced upper end of said spout and clamped at its outer edge between the upper end of the spout and the internal flange of the body, the inner portion of the upper surface of said valve seat gasket being exposed for engagement by the seat-engaging flange of the valve head, the external flange of the valve head being positioned in spaced relation to and above the internal flange of the valve body when the seat-engaging flange of the valve head is engaged with the valve seat gasket, removal of the spout and valve seat gasket permitting seating engagement of the external flange of the valve head with the internal flange of the body for temporarily stopping most of the flow of fluid through the valve when the nozzle and valve seat gasket are removed for renewal of the latter, and a cylindrical enlargement rigid with the lower end of the valve stem and having a cylindrical socket in the bottom thereof, said valve head having a cylindrical upper portion rotatably fitting in the socket of said enlargement and provided with an external annular groove, and pins carried by said enlargement and engaging in said groove to swivelly connect said head to said enlargement.

JOHN M. SHEEDY.